United States Patent
Chitti

(10) Patent No.: US 7,907,896 B2
(45) Date of Patent: Mar. 15, 2011

(54) MOBILE COMMERCE METHOD AND DEVICE

(75) Inventor: Sriram Chitti, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 378 days.

(21) Appl. No.: 11/413,330

(22) Filed: Apr. 28, 2006

(65) Prior Publication Data

US 2007/0254712 A1 Nov. 1, 2007

(51) Int. Cl.
*H04B 5/00* (2006.01)

(52) U.S. Cl. ............... 455/41.1; 455/41.2; 455/456.1; 455/517; 455/518

(58) Field of Classification Search ............. 455/41.1, 455/41.2, 558, 456.1, 517
See application file for complete search history.

(56) References Cited

U.S. PATENT DOCUMENTS

| | | | | |
|---|---|---|---|---|
| 5,929,848 A * | 7/1999 | Albukerk et al. | ............. | 715/700 |
| 7,065,538 B2 * | 6/2006 | Aronoff et al. | ............. | 707/202 |
| 7,221,399 B2 * | 5/2007 | Fujita et al. | ............. | 348/340 |
| 7,433,678 B2 * | 10/2008 | Beckers | ............. | 455/411 |
| 2004/0002305 A1 * | 1/2004 | Byman-Kivivuori et al. | ............. | 455/41.2 |
| 2007/0111662 A1 | 5/2007 | Beckers et al. | | |

FOREIGN PATENT DOCUMENTS

WO WO 2005/066587 A1 7/2005
WO WO 2005/0666587 7/2005

* cited by examiner

*Primary Examiner* — Tuan H Nguyen
(74) *Attorney, Agent, or Firm* — Gary J. Cunningham; Phillip Burris

(57) ABSTRACT

Disclosed are methods for a near-field communication/RFID enabled mobile communication device. The methods include receiving from a first affiche a first near-field communication that initiates a process of an application of the mobile communication device, and receiving from a second affiche a second near-field communication that finalizes the process of the application of the mobile communication device. Also disclosed is a system including a first affiche having a near-field communication device configured to communicate with a mobile communication device so that the mobile communication device initiates a process of an application, and a second affiche having a near-field communication device configured to communicate with the mobile communication device so that the mobile communication device finalizes a process of the application. Further disclosed is a mobile communication device having a near-field communication reader and including an application stored in the memory and responsive to a signal from the near-field communication reader.

20 Claims, 2 Drawing Sheets

POSITION A

POSITION B

MOBILE COMMERCE METHOD AND DEVICE

FIELD

Described are a method and device for m-commerce. More particularly, disclosed is a method and device for initiating an application and selecting one or more electronic cards for a mobile commerce transaction.

BACKGROUND

The makers of mobile communication devices, including those of cellular telephones, are increasingly adding functionality to their devices. For example, cellular telephones include features such as still and video cameras, video streaming and two-way video calling, email functionality, Internet browsers, music players, FM radios with stereo audio, and organizers. Cellular telephones in particular are becoming more than simply mobile communication devices. They are evolving into powerful tools for information management.

Mobile commerce (m-commerce) is yet another functionality being incorporated into the operations of mobile communication devices. Mobile commerce refers to transactions using a wireless device and data connection that result in the transfer of value in exchange for information, services, or goods. Protocols such as Near field communication (NFC), Bluetooth, radio frequency identification (RFID), personal area network (PAN), as well as Internet capabilities, can enable mobile communication devices such as cellular telephones and PDAs to carry out financial transactions. Mobile commerce, facilitated generally by mobile communication devices, can include services such as banking, payment, and ticketing. Accordingly, mobile communication devices may replace traditional wallets and credit cards. The emerging technology behind m-commerce may transform the mobile communication device into an electronic wallet.

Mobile communication device users can finalize a transaction to pay for items or services when their mobile communication device comes within range of a point-of-sale (POS) terminal. However, prior to finalization of a transaction there may be several manual steps required to be done by the user. For finalization of a transaction, the mobile communication device may communicate with the POS terminal via an RFID reader including an NFC microchip and RFID tag pair. The POS terminal can send an inquiry to the microchip of the device, which can send a serial number and a single-use cryptogram. The POS terminal then can send the two pieces of data to its bank, which can then forward them on to the user's bank for verification and approval. The user's mobile communication device's microchip can emulate an e-wallet, credit card or the like or other type of account the user specifies.

Before finalizing a transaction at the POS terminal, typically the user of the mobile communication device manually initiates an application in the mobile communication device to select a payment method for the purchase. For example, a user may have a plurality of payment methods available on the mobile communication device, including several credit cards, debit cards, loyalty cards, gift cards, and stored value cards that operate in a number of different manners. Accordingly, prior to the POS transaction, the user of the mobile communication device may normally choose the payment method, for example, by scrolling through a menu of options, or by prompt. It may be inconvenient for the user to spend time to search for the appropriate transaction method or payment method stored in the mobile communication device for use at the POS terminal. It would be beneficial to automate the process of payment at the POS terminal.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
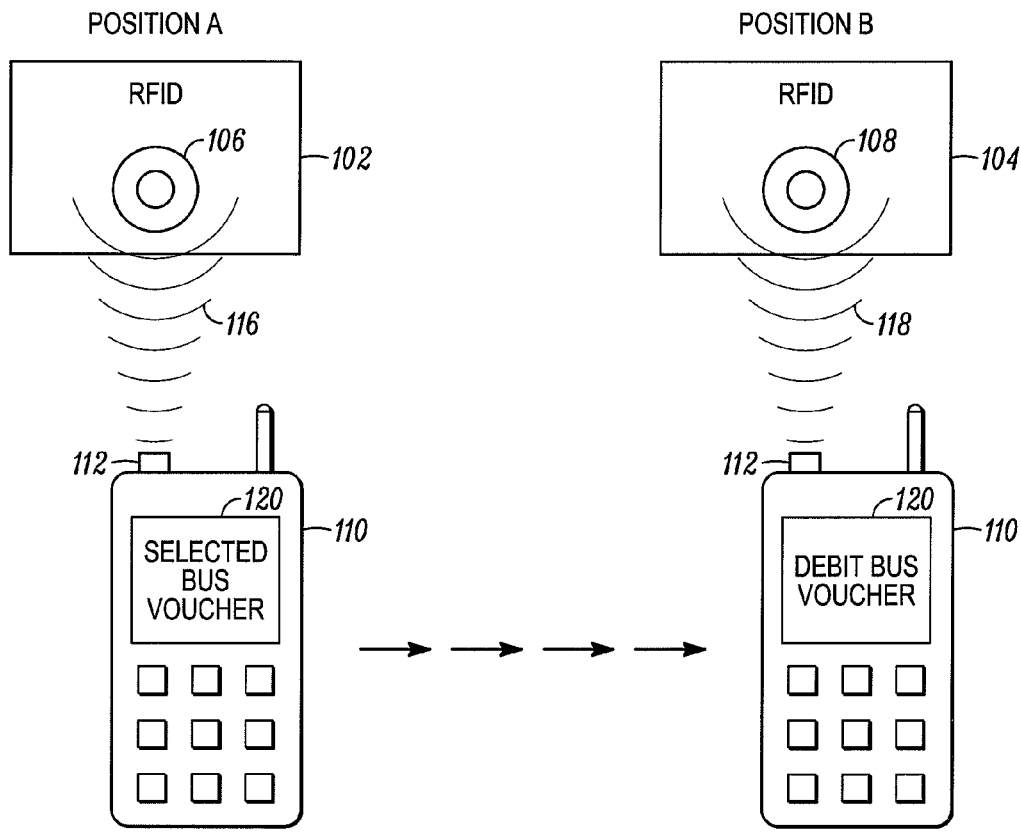
FIG. 1 depicts a first affiche and second affiche in positions A and B respectively.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Disclosed are methods for a near-field communication/radio frequency identification (RFID) enabled mobile communication device. The methods include receiving from a first affiche a first near-field communication that initiates a process of an application of the mobile communication device, and receiving from a second affiche a second near-field communication that finalizes the process of the application of the mobile communication device. The affiche can be a posted notice such as a poster or a placard. The notice can indicate where to position a mobile communication device to establish near-field communication to establish wireless communications and thereby initiate and/or finalize a transaction. The affiche may be positioned, for example, on a wall, on a table, or on any surface. The communication received from the first affiche may be in the form of an RFID signal of an RFID tag imbedded in the affiche. The first near-field communication can initiate an application of the mobile communication device for automatic selection of a payment method prior to processing and/or finalizing the transaction at the second affiche or point of sale (POS) terminal.

Also disclosed is a system including a first affiche having a near-field communication device configured to communicate with a mobile communication device so that the mobile communication device initiates a process of an application, and a second affiche having a near-field communication device configured to communicate with the mobile communication device so that the mobile communication device finalizes a process of the application.

Further disclosed is a mobile communication device having a near-field communication reader and including an application stored in the memory and responsive to a signal from the near-field communication reader. The application can include an initiation module configured for initiation of a process of the application upon receiving a signal from a first near-field communication device embedded in a first affiche, and a finalization module configured for finalization of a process of the application upon receiving a signal from a second near-field communication device embedded in a second affiche.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a first affiche 102 and a second affiche 104 in positions A and B respectively. An affiche can be a written or printed notice to be posted, for example on a wall, such as a poster or a placard. As mentioned, the notice can indicate, for example by indicia, where to position a mobile communication device to establish near-field communication (NFC) to initiate and finalize a transaction. An affiche can be positioned in any suitable location. The distance between the affiches may be any length. There may be two or more affiches. Also, the two affiches depicted in FIG. 1 may be combined at one location. Furthermore, an affiche can include one or more embedded NFC devices, such as an RFID tag. In FIG. 1, affiche 102 includes an RFID tag 106 and affiche 104 includes an RFID tag 108. It is understood that the near-field communication signal can be of any type that can be configured to enable m-commerce.

The mobile communication device 110 is shown in two positions such as positions A and B. The mobile communication device 110 may be implemented as a cellular telephone (also called a mobile phone). The mobile communication device 110 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multimedia content access and/or voice over internet protocol (VoIP).

The mobile communication device 110 can include a NFC device 112 of any suitable type. The NFC device 112 may be a NFC reader in one embodiment. The NFC device 112 can also be an RFID tag. As illustrated in FIG. 1, the RFID tags 106 and 108 may generate signals 116 and 118 respectively. That is, the first affiche 102 includes a near-field communication device 106 configured to communicate via a communication signal 116 with a mobile communication device 110 so that the mobile communication device 110 initiates a process of an application. The second affiche 104 includes a near-field communication device 108 configured to communicate via a communication signal 118 with the mobile communication device 110 so that the mobile communication device 110 finalizes a process of the application. In one embodiment, the mobile communication device has an RFID tag which is read by an NFC device to finalize the process of the application.

An initiation of an application can include a selection of one or more electronic cards and/or selection of a method of payment in response to the device 110 receiving a communication signal 116 from the NFC device 106. Accordingly, by positioning device 110 with the NFC device 112 such as by waving or tapping the device 110 near or on the affiche 102 having an embedded RFID tag 106, the mobile communication device 110 can receive signal 116. The signal 116 from the RFID tag 106 may be configured to launch an application in the device 110. Shown on the display device 120 are indicia indicating an example of an initiation of a process of an application. In this example, upon initiation of an application the display device 120 shows the selection of a bus voucher.

In a similar manner, by positioning the device 110 within range of the NFC device 112 such as by waving device 110 or tapping device 110 near or on the second affiche 104, the communication device 110 can receive signal 118. Shown on the display device 120 are indicia indicating an example of a finalization of a process of an application. A finalization of an application can include finalization of a transaction. In this example, the display device 120 shows the debit from a bus voucher. In this embodiment, the device 110 has an RFID tag that is read by the NFC device at the point of sale for example.

A user may have a plurality of payment methods available on the mobile communication device. In particular, a number of different "electronic cards" such as credit cards, debit cards, loyalty cards, gift cards, and stored value cards that can operate in any number of different manners may be stored on or available to the mobile communication device. It is understood that any manner in which the "cards" operate, that is, including storing values on the cards, or storing values at a backend server, is within the scope of this discussion. Additionally, "cards" may be downloaded into memory of the mobile communication device at any time. Furthermore, "cards" may be accessed via, for example, the Internet at any time as well. It is understood that the term "electronic card" is meant to include any type transaction vehicle that may be used to finalize any type m-commerce event.

Figure 2:
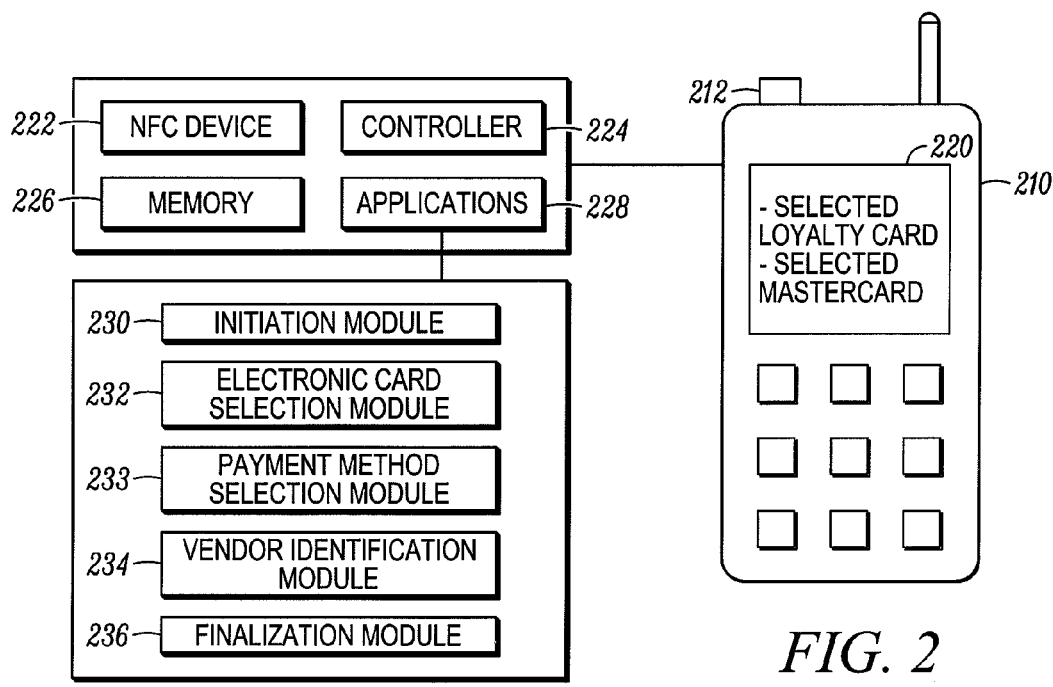
FIG. 2 shows a device having a near-field communication reader device and a display device.

FIG. 2 shows a device 210 having a NFC reader device 212 and a display device 220. Also shown are certain components that can be part of the mobile communication device such as NFC device 222 to receive and process signals from the NFC reader 212 including, for example, a NFC microchip, a controller 224, memory 226 and applications 228 that can include modules such as an initiation module 230, an electronic card selection module 232, payment method selection module 233, vendor identification module 234 and finalization module 236. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The display device 220 of device 210 of FIG. 2 depicts indicia indicating an example of an initiation of a process of an application that results from receiving a data carrying NFC signal from the RFID tag embedded in the first affiche. In this example, the display device 120 shows the selection of electronic cards such as a "loyalty card" and the selection of a MASTERCARD. Briefly referring to FIG. 1, the data carried on the communication signal 116 of the RFID 106 can provide any type of information. The first affiche 102 includes the NFC device 106 that can be configured to communicate with a mobile communication device 110 so that the mobile communication device initiates a process of an application. It is understood that data within the NFC device 106 can be programmed to carry any type of information, including but not limited to, links to websites, software modules and read-only files. As mentioned above, the data of the signal of the NFC device 106 can be read by suitable scanners wirelessly from a suitable distance. Like any wireless communication, digital tags or RFID also uses a range of frequency bands, low, intermediate and high frequency to transfer data in a non-contact fashion.

The NFC device 106 can carry data such as simple information as well as complex information. RFID (radio frequency identification) is a technology that incorporates the use of electromagnetic or electrostatic coupling in the radio frequency (RF) portion of the electromagnetic spectrum. RFID is coming into increasing use in industry as an alternative to the bar code. The advantage of RFID is that it does not require direct contact or line-of-sight scanning. An RFID system may include three components: an antenna and transceiver (often combined into one reader such as NFC reader device 112 on mobile communication device 110) and a transponder (the RFID device 106). The antenna uses radio frequency waves to transmit a signal that activates the transponder. When activated, the RFID device transmits data back to the mobile communication device 110. The data can be used to notify a programmable logic controller or other controller 224 that an action should occur. The action could be as simple as raising an access gate or as complicated as interfacing with a database to carry out a monetary transaction. Low-frequency RFID systems (30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet).

As mentioned above, the display device 220 of device 210 of FIG. 2 depicts indicia indicating an example of an initiation of a process of an application which may be effected by initiation module 230 as a result of receiving a signal from an embedded RFID tag of the first affiche. In this example, as mentioned above, the display device 120 shows the selection of a "loyalty card" and the selection of a MASTERCARD, which may be effected by electronic card selection module 232. Accordingly, the RFID device 106 may provide data that initiates a process of an application and provides a selection of electronic cards.

Were a user to shop in a store, for example, prior to being within range of a NFC device of the POS terminal at position B, the data transmitted from the RFID device 106 at position A can initiate an application and select electronic cards that are stored in the memory 226 of the mobile communication device 210. The card selection module 232 may provide instructions for card selection. The RFID 106 may effect the selection of the loyalty card for the store. Also, the selection of a default credit card, for example, set by the user according to user preferences, may be effected. The payment selection criteria according to the payment method selection module 233 may therefore be set by user preferences depending for example on data processed by vendor identification module 234, bank balances, or any other suitable manners. After selecting the electronic cards, the device 210 may finalize the transaction at the RFID device 108, such being for example, a POS terminal.

An affiche including a near-field communication device configured to communicate with a mobile communication device so that the mobile communication device initiates a process of an application may be positioned in a queue in which a user is waiting to make a purchase at a POS terminal. In another embodiment, an affiche including a near-field communication device configured to communicate with a mobile communication device so that the mobile communication device initiates a process of an application may be next to or configured in conjunction with a POS terminal.

Figure 3:
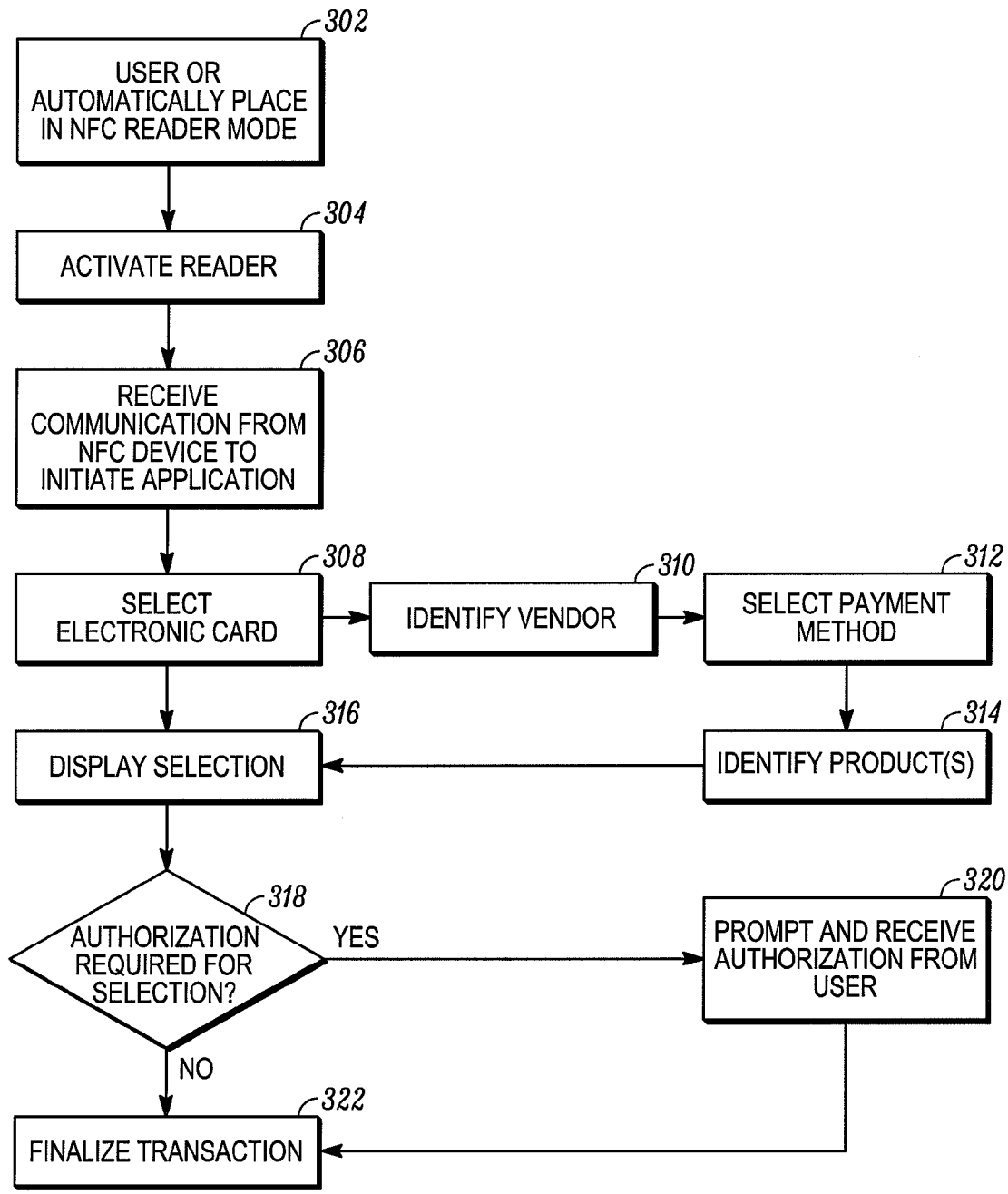
FIG. 3 is a flow chart of an embodiment of the disclosed methods of the mobile communication device.

FIG. 3 is a flow chart of an embodiment of the disclosed methods of the mobile communication device. An NFC reader device of the mobile communication device may by placed in communication mode 302 by the user or automatically. Once the NFC reader is activated 304 either manually or automatically, it can receive from a first affiche a first near-field communication that initiates a process of an application of the mobile communication device 306. It is understood that while this disclosure mostly refers to m-commerce transactions, any application of a mobile communication device that is initiated by receiving from a first affiche a first near-field communication, and subsequently finalized by receiving from a second affiche a second near-field communication is within the scope of this discussion. It is understood that there are many different uses for the disclosed methods, systems and devices.

In one embodiment, the initiation of an m-commerce application is provided. A user may have stored in the mobile communication device a plurality of electronic cards. In addition, many different types of card may be stored, for example, a metro card that is prepaid, a loyalty card that receives points from a vendor, a gift card and one or more credit cards. As discussed above, any type of electronic card or other transaction facilitating data may be stored in or accessible to the mobile communication device. In any event, the method can include selecting from those electronic cards stored or otherwise accessible 308.

The selection of an electronic card may include selecting more than one card. For example, the selection module 232 may find four cards pertaining to identification of a particular vendor 310 included with those stored. They could include, for example, a loyalty card, a gift card, a parking validation card, and a credit card. A parking ticket may be downloaded to the mobile communication device as a user entered a parking structure. The parking ticket may be selected 308 and a validation may be processed along with transaction elements when the transaction is finalized 322.

The method for payment selection 312 according to instructions of the payment method selection module may be selected for example by default as it may be pre-selected by the user at any time before or during the process. The hierarchy or payment selection criteria for example to determine choice of bank cards, of the automatic selection process 308 may be established by user or other preferences and/or may be assisted by prompts to the user during the selection process. In this way, rules may be established regarding which card to choose based on, for example, vendor identification or bank balances. The products available may also be identified 314 via data transmitted by the NFC device of the first affiche, or any other NFC device. It is understood that the steps of the described method may be in any order, and may include fewer or more steps.

The automatic selection of the electronic cards may be displayed 316 on the display device of the mobile communication device. In the event that there is authorization required for selected items 318, the device may generate a prompt to the user 320. In the event that the user responds affirmatively, the transaction may be finalized at the POS terminal or the second affiche 322. In the event that no authorization is required for selected items 318, the transaction may be finalized at the POS terminal or the second affiche 322.

While the embodiment shown in the flow chart of FIG. 3 includes an initiation and a finalization of an application, as mentioned some steps may be eliminated from the method and other steps may be provided to the method and are within the scope of this discussion. The use of the term "electronic card" is intended to include all types of transaction data.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A near-field communication method of a mobile communication device, comprising:
   receiving from a first affiche a first near-field communication that initiates a process of an application of the mobile communication device; and
   receiving from a second affiche a second near-field communication that finalizes the process of the application of the mobile communication device,
   wherein the first affiche and the second affiche are different.

2. The method of claim 1, further comprising:
   selecting automatically an electronic card.

3. The method of claim 1 further comprising:
   selecting automatically a payment method.

4. The method of claim 1 further comprising:
   identifying automatically a vendor.

5. The method of claim 1 further comprising:
   identifying automatically a product to purchase.

6. The method of claim 1, further comprising:
   receiving authorization to authorize payment to a vendor.

7. The method of claim 1 wherein receiving from the first affiche a first near-field communication comprises:
   receiving an RFID signal by an RFID reader of the mobile communication device.

8. The method of claim 7 wherein the first affiche comprises:
   indicating indicia for a indicating a position of an RFID tag on the affiche.

9. A near-field communication system, comprising:
   a first affiche comprising a near-field communication device configured to communicate with a mobile communication device so that the mobile communication device initiates a process in an electronic wallet application; and a second affiche comprising a near-field communication device configured to communicate with the mobile communication device so that the mobile communication device executes a transaction finalizes the process with the electronic wallet application; wherein the first affiche and the second affiche are different.

10. The system of claim 9 further comprising:
    an automatic selection of an electronic card.

11. The system of claim 9 further comprising:
    an automatic selection of a payment method.

12. The system of claim 9 further comprising:
    an automatic identification of a vendor.

13. The system of claim 9 further comprising:
    an automatic identification of a product to purchase.

14. The system of claim 9 further comprising:
    an authorization of a payment to a vendor.

15. The system of claim 9 wherein the first affiche comprises indicia.

16. The system of claim 9 wherein the near-field communication device of the first affiche is an RFID tag.

17. A mobile communication device, comprising:
    a controller;
    a memory coupled to the controller;
    a near-field communication reader device coupled to the controller;
    an application capable of executing an electronic transaction stored in the memory and responsive to a signal from the near-field communication reader, the application comprising:
    an initiation module configured for initiation of a process of the application upon the near-field communication reader being proximately located with and receiving a signal from a first near-field communication device embedded in a first affiche; and
    a finalization module configured to execute the electronic transaction of the application upon the near-filed communication reader being proximately located with and receiving a signal from a second near-field communication device embedded in a second affiche;
    wherein the first affiche and the second affiche are different.

18. The device of claim 17, further comprising:
    an electronic card selection module configured for automatic selection of an electronic card.

19. The device of claim 17 further comprising:
    a payment method selection module configured for automatic selection of a payment method.

20. The device of claim 17 wherein the near-field communication reader is an RFID reader.

* * * * *